(12) United States Patent
Cremades Schulz et al.

(10) Patent No.: US 6,375,778 B1
(45) Date of Patent: Apr. 23, 2002

(54) PROCESS FOR FABRICATING LINERS, AND LINER FOR A VEHICLE ROOF WITH INTEGRATED FUNCTIONS

(75) Inventors: Alberto Cremades Schulz, Cordoba; Eleuterio Gonzalez Güemes, Burgos; Jose Manuel Dominguez Ruano; Alberto Ortega Martinez, both of Valladolid, all of (ES)

(73) Assignee: Grupo Antolin-Ingenieria, S.A., Burgos (ES)

( * ) Notice: Subject to any disclaimer, the term of this patent is extended or adjusted under 35 U.S.C. 154(b) by 0 days.

(21) Appl. No.: 09/403,845

(22) PCT Filed: Feb. 27, 1998

(86) PCT No.: PCT/ES98/00049

§ 371 Date: Mar. 17, 2000

§ 102(e) Date: Mar. 17, 2000

(87) PCT Pub. No.: WO99/43517

PCT Pub. Date: Sep. 2, 1999

(51) Int. Cl.[7] ............................ B60R 13/01; B60R 16/02
(52) U.S. Cl. ................. 156/212; 156/292; 264/272.11; 264/272.14; 264/272.16
(58) Field of Search ................................. 156/145, 212, 156/213, 214, 245, 292, 383; 264/271.1, 272.11, 272.14, 272.16, 272.17, 277, 279.1

(56) References Cited

U.S. PATENT DOCUMENTS

| 4,119,794 A | | 10/1978 | Matsuki |
| 4,572,856 A | * | 2/1986 | Gembinski .................... 428/71 |
| 4,904,429 A | | 2/1990 | Takahashi et al. |
| 5,016,934 A | | 5/1991 | Pelz |
| 5,196,151 A | | 3/1993 | Sakaida et al. |

FOREIGN PATENT DOCUMENTS

| EP | 0 364 102 | 4/1990 |
| EP | 0 411 376 | 2/1991 |
| EP | 0 553 795 | 8/1993 |
| JP | 2-158304 | 6/1990 |

OTHER PUBLICATIONS

Guarnecido Autoportante Para Recubrimiento Interrior De Techos De Vehiculos Irausa Ingenieria, S.A.

\* cited by examiner

Primary Examiner—Sam Chuan Yao
(74) Attorney, Agent, or Firm—Rosenman & Colin LLP

(57) ABSTRACT

The lining is provided with a support layer (4) which can be shaped in a mold so that recesses (8) are formed in it, which will receive the various functions (5), said support (4) complemented by the remaining layers (9) which make up the lining, which are also suitably shaped in order to adapt to support (4), closing the openings of recesses (8). The procedures consists of forming support (4), housing functions (5) in its recesses (8), and in another press, or simultaneously and in the same one, forming the remaining layers (9), and finally attaching the set with suitable adhesives.

12 Claims, 8 Drawing Sheets

Position A

Position B

Position B

PROCESS FOR FABRICATING LINERS, AND LINER FOR A VEHICLE ROOF WITH INTEGRATED FUNCTIONS

DESCRIPTION

Object of the Invention

The invention relates to a new process for manufacturing liners for vehicle roofs, particularly for roofs with certain integrated functions, such as electrical conducts, lamp soffits, electrical connectors, thin flat speakers, head airbags, etc., this process allowing to quickly and efficiently obtain the linings with an optimal level of performance.

The invention also encompasses a lining for vehicle roofs with integrated functions such as those related above.

BACKGROUND OF THE INVENTION

As is well known, vehicle roofs incorporate an inner lining which must offer minimum performance, such as being self-supported, being easily and perfectly adaptable to the diverse shapes of vehicle roofs, being lightweight, having good acoustical absorption and thermal insulation properties and a pleasant external look and feel.

In order to fulfill these requirements, the use of multilayer liners is generally resorted to, in which different materials are arranged in thin layers, so that each layer provides its characteristics to the lining, with these layers glued to each other to create the layered element.

A common configuration used consists of a first layer, in contact with the roof, made of a liner material, to which is adhered a second layer consisting of a fiberglass grid or mesh, these layers being joined to each other by glue. Over the fiberglass grid or mesh is placed a substantially thicker central layer, on top of which is another fiberglass grid or mesh, and then a final outer layer which is the visible layer of the lining, this last layer made of a lightweight material. All of the layers which make up the lining, except for the outer or cosmetic layer, support such lining to provide the suitable stiffness and the aforementioned self-supporting property.

More recently, manufacturers of the automobile industry have required from their suppliers not only the roof lining, but also the set formed by said lining and certain functions, such as sun shades, handles, lamp soffits or electrical wiring, with all of these accessories assembled at a later stage of the roof forming in a press. In this sense also known are vehicle linings which have these accessories pre-assembled, so that when the lining is attached to the vehicle roof the above mentioned accessories are automatically installed. A roof of this type is described in Spanish Patent 9301338 belonging to this applicant.

More evolved systems even include an electrical or electronic component for simply and quickly connecting, for example, the power connection required by lighting systems. In this sense we can cite European Patents 0346154 and 0473263, as well as Spanish Patent 8607841.

DESCRIPTION OF THE INVENTION

The process proposed by the invention, and therefore the lining obtained with it, constitutes a novel technological advance in the field as it integrates all the functions required in the lining manufacturing process, where these functions are such as electrical connectors, electronic plates or devices, air conditioning and heating ducts, electrical wiring, flat speakers, head airbags, etc.

With this purpose and more specifically, the process employs a press with two upper fixed positioning mould and a single lower mould with three positions, where the process stages are the following:

At a first position (A) of the lower mould, in which it is not opposite the two upper moulds, the function supporting material is placed on top of it, with the aforementioned lower mould having a suitable profile for defining on said support the recesses which will house such functions.

At a second operative stage the lower mold is placed in position (B) beneath the first fixed upper mold, whose profile is complementary to that of the single lower mold, defining the aforementioned recesses when one mold is placed against the other.

At a third operative stage the lower mold returns to position (A) to receive the functions which are housed in its recesses, and on top of this the layers of different materials which complete the lining with the suitable adhesives when required for their final attachment.

After this the lower mold is sent towards position (C) beneath the second upper mold, and as these two molds are joined the aforementioned complementary layers of the lining adapt their shape to the base support on which the different functions were already set, creating housings for these and completing the lining.

Finally, the lower mold returns to position (A), that is, a position where it is not opposite any of the upper molds, when the finished lining is extracted with the functions set within it.

In accordance with the above exposition the lining must be made in a suitable material for forming the recesses or compartments for the different functions, maintaining stable this deformation after pressing, in order for which the support layer will consist of thermoplastic, thermostable or composite materials.

Returning once again to the process, the possibility exists of using two presses, so that the first press deforms the support body to obtain the recesses for the functions and a second press joins this support to its functions and shapes the rest of the lining layers, as well as the outer coating.

A possible variation of this realisation consists of using two presses with two identical lower molds and two different upper molds, one for shaping the required references and housings for the functions and another to give it its final shape of the roof. Firstly a set of layers is formed, one of card or paper, on it a fiberglass layer and finally a polyurethane layer with an adhesive on its lower face, i.e. between the polyurethane and fiberglass layers.

This first set of layers is introduced in a first press where the required references and the housings for the functions are formed. Afterwards the formed layer set is removed from the press, to later distribute in it the desired functions to be integrated. On top of this set is placed another set formed by the remaining layers and the outer coating, both to be later introduced in a second press which will give the final shape to the lined roof.

By using two different presses there is also the possibility of obtaining in one the support and simultaneously in another the remaining layers of the lining, so that the functions are later coupled to the support and the remaining layers which make up the lining are later joined as a cover of the recesses.

DESCRIPTION OF THE DRAWINGS

As a complement of the description in progress and in order to aid a better comprehension of the characteristics of the invention, according to an example of a preferred realisation of the same, as an integral part of the description, a set of drawings is attached in which for purposes of illustration and in a non-limiting nature the following is shown.

PREFERRED EMBODIMENT OF THE INVENTION

In view of these figures, specifically of FIGS. 1 to 8, one can see how the process of the invention is based on the use of a press with a single movable lower mold (1) and two upper fixed molds (2) and (3), where lower mold (1) may occupy any of three positions, one completely independent from the upper molds (position A) and another two which are opposite the latter, a position B opposite mold (2) and a position C opposite mold (3).

Figure 1:
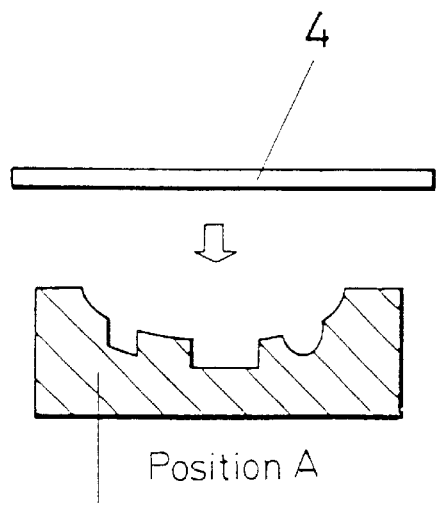
FIGS. 1 to 8 show successive stages of the manufacturing process for linings object of the present invention using one press with two upper fixed molds and a single moving lower mold which may occupy positions A, B and C.
Figure 2:
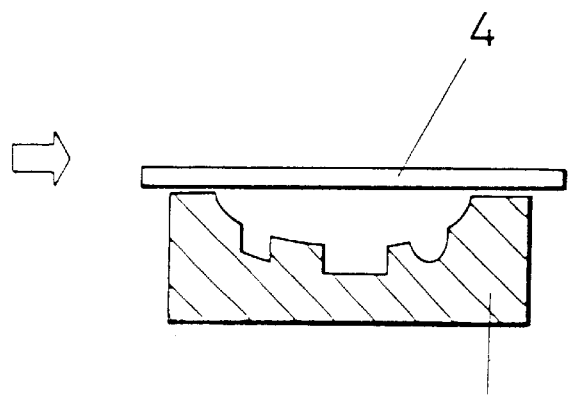
Figure 3:
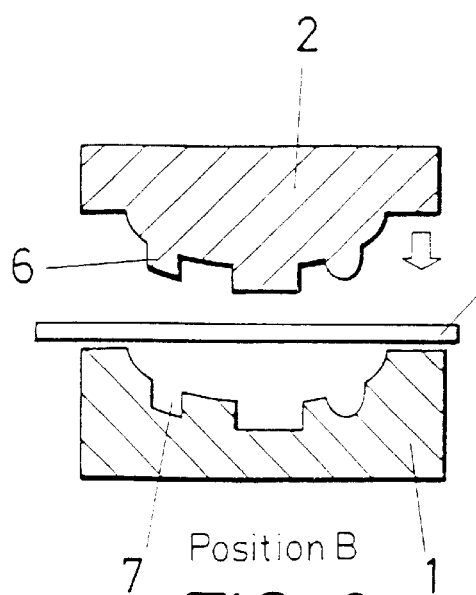
Figure 4:
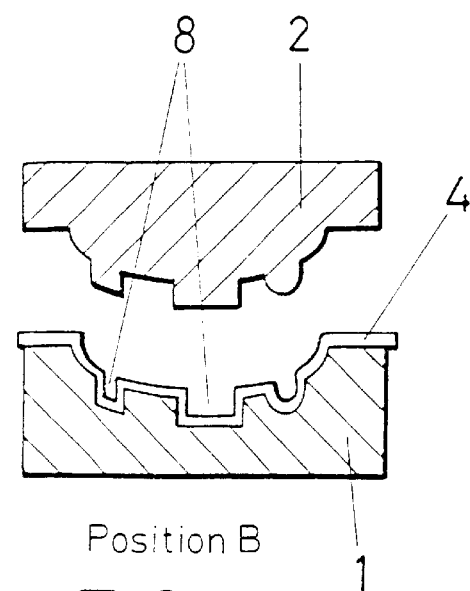
Figure 5:
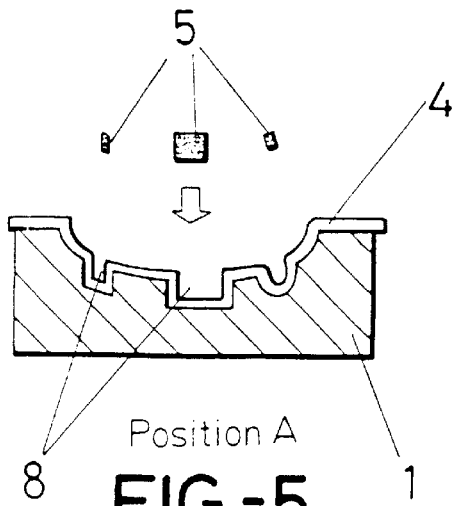

The process begins at position A, as seen in FIGS. 1 and 2, where on top of upper mold (1) is placed layered body (4), which is initially flat, and which forms the support of the different functions (5), upon which mold (1) travels to position B opposite the first upper mold (2) as shown in FIG. 3, molds (1) and (2) having tongue (6) and groove (7), so that after closing one mold on the other, recesses (8) are defined in support (4) for functions (5), as seen in FIG. 4.

After this functions (5) are inserted in recesses (8), for which mold (1) returns to position (A), where the functions (5) can be easily inserted.

Figure 6:
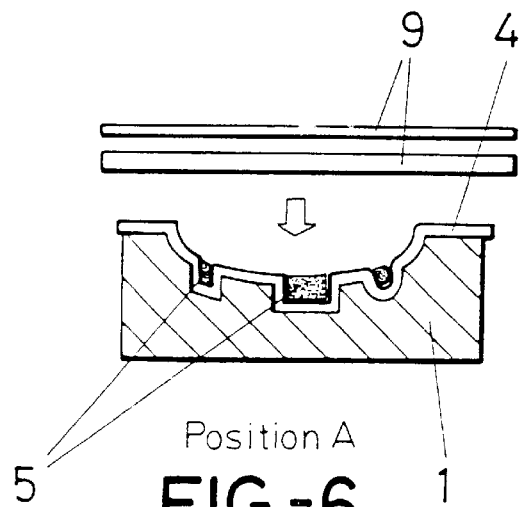
Figure 7:
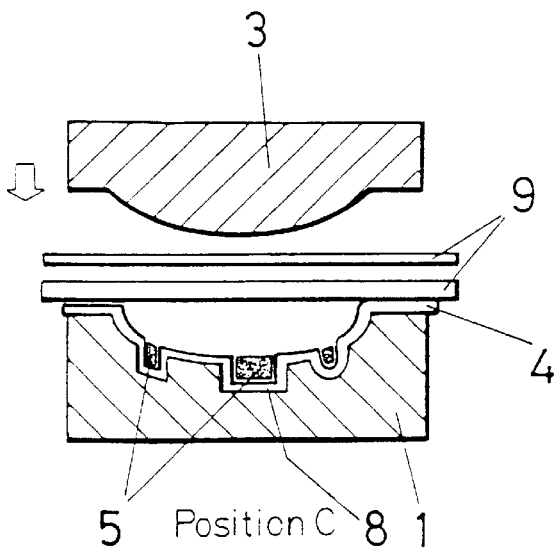
Figure 8:
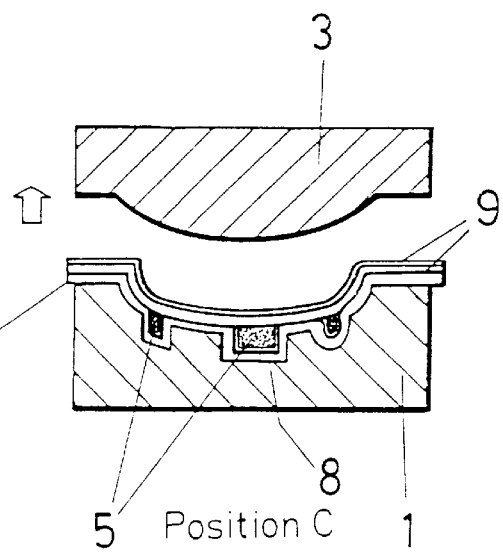
Figure 9:
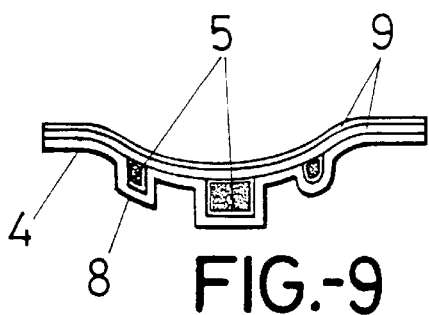
FIG. 9 shows a detailed cross section of a lining for vehicle roofs with integrated functions obtained by the process of the previous figures.
Figures 10, 11:
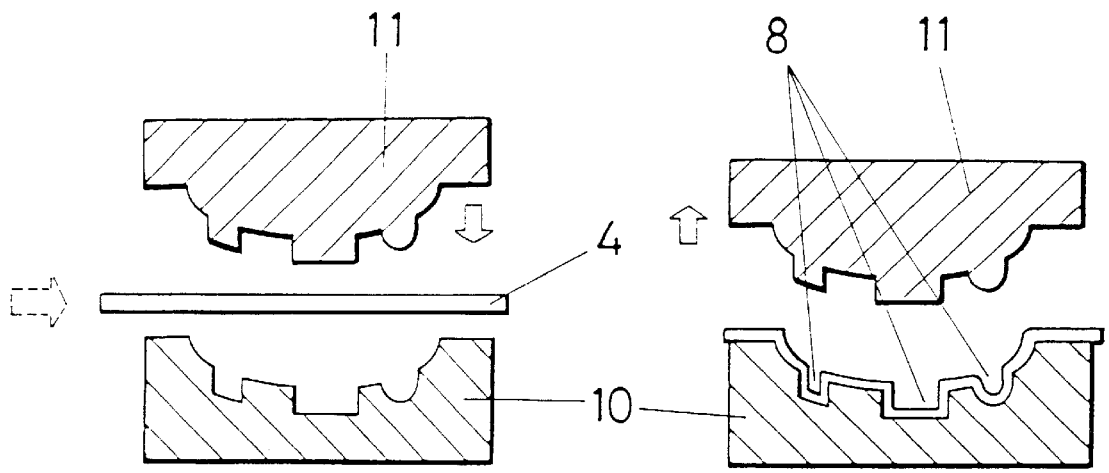
FIGS. 10 to 17 show the different sequences of an alternative realisation of the process of FIGS. 1 to 8 which results in the same lining of FIG. 9, but which uses two presses with identical lower fixed molds and different upper molds.
Figures 12, 13:
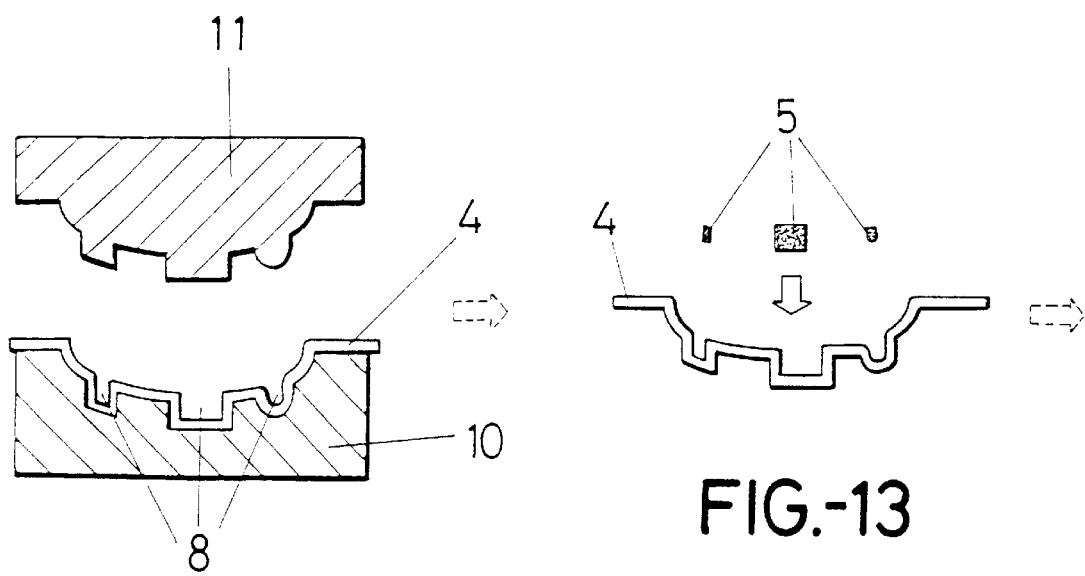
Figure 14:
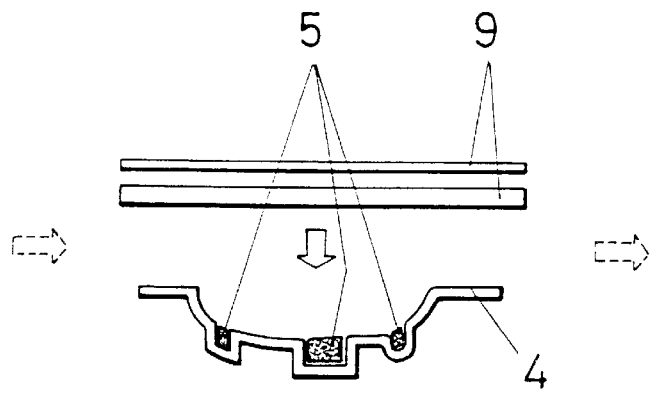
Figure 15:
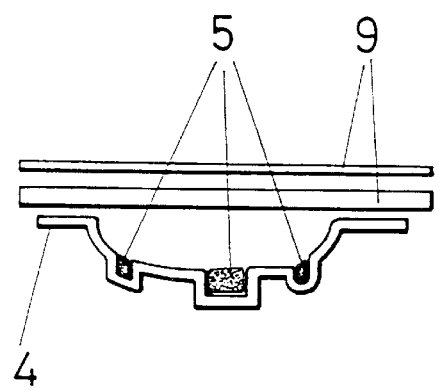
Figure 16:
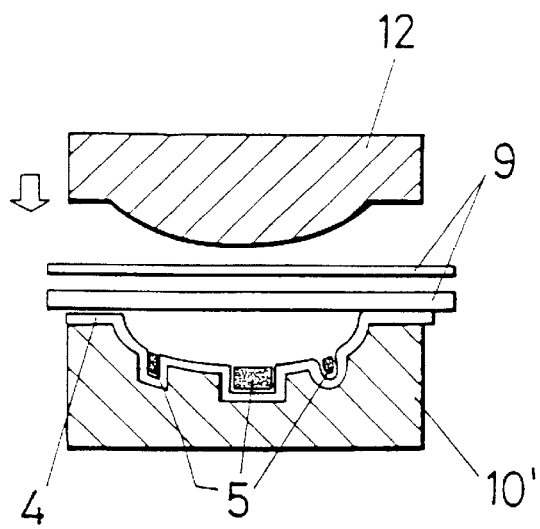
Figure 17:
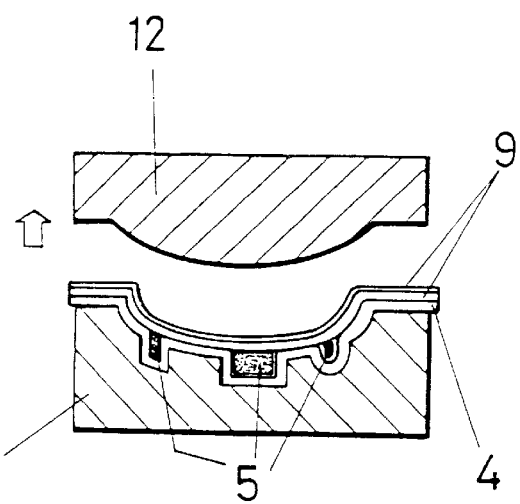
Figures 18, 19:
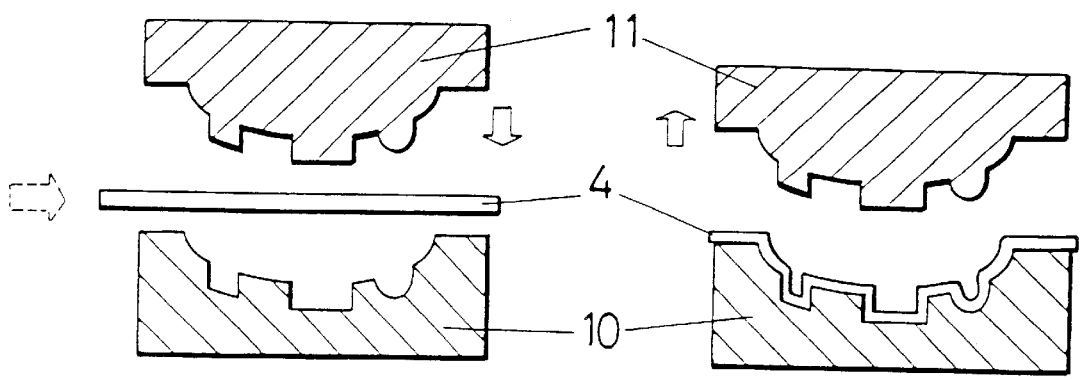
FIGS. 18 to 24 finally show the different sequences of another alternative realisation of the process of FIGS. 1 to 8 which also results in the lining of FIG. 9 where shaping of the support and the rest of the roof is done separately in different presses, and these are later joined.

At this time, on mold (1) and specifically on support (4) and functions (5) are set the remaining layers (9) which form part of the lining, as shown in FIG. 6, after which the set is moved to position (C), shown in FIG. 7, under second upper mold (3) which is suitably configured so that layers (9) are deformed until they match support (4), closing the mouths of the recesses (8) as shown particularly in FIG. 8, at which position the lining of FIG. 9 is obtained perfectly finished with its functions integrated in it, with its visible face facing upwards and its hidden face downwards.

Nevertheless, it is possible to use two independent presses, as shown in FIGS. 10 to 17, so that molds (10) and (11) of the first press are configured so that support (4) is suitably deformed, configuring in it the recesses (8) of the previous case, in which case support (4) is extracted from the first press already formed and functions (5) are to be inserted within it, as shown in FIG. (13), the remaining layers (9) which make up the lining being adapted to this set as well as the outer coating, not yet deformed, in order to introduce the set in a second press in which the lower mold (10'') matches mold (10) of the first press, while mold (12) is configured to suitably deform layers (9) as done by mold (3) in the previous case, with the same lining of FIG. 9 being obtained as a result.

This alternative realisation can also be carried out as shown in FIGS. 25 to 34, where a first set of layers (17) is formed by a wide layer of card or paper (16), on top of which is a layer of fiberglass (15) and finally a polyurethane layer (14) with an adhesive on its lower face.

Figure 34:
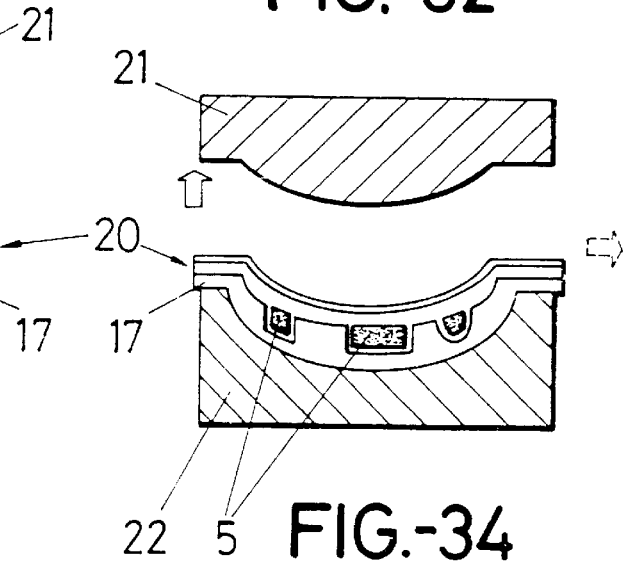

This set of layers (17) is inserted in the first press on lower mold (18) on which upper mold (19) acts to form in this first set of layers (17) both the required references and the housings for functions (5). Afterwards set of layers (17) is removed already shaped, to distribute functions (5) within it. Additionally, a second set of layers (20) is formed which incorporates the outer coating and it is placed on the first set of layers (17) as shown in FIG. (30). Both sets of layers (17) and (20) are introduced superimposed in the second press, where as mold (21) closes on lower mold (22) the roof lining is finally formed as shown in FIG. 34.

The second set of layers (20) may consist of a polyurethane layer soaked in adhesive on its lower and upper faces, with a fiberglass layer on top of this polyurethane layer. As an option, the second set of layers (20) may consist of a fiberglass layer plus an adhesive layer on top.

The tasks of placing the first set of layers (17) in the first press, distributing functions (5), placing the second set of layers (20) on top of the first one and placing both sets in the second press can be performed manually or automatically.

Figures 20, 21:
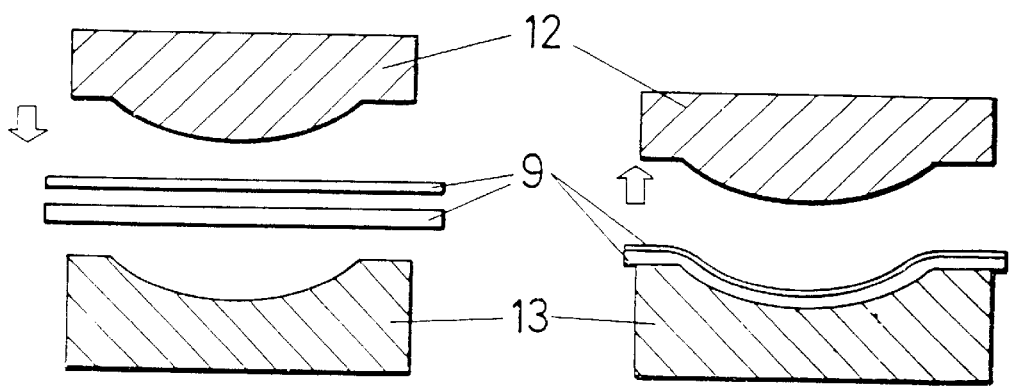
Figures 22, 23:
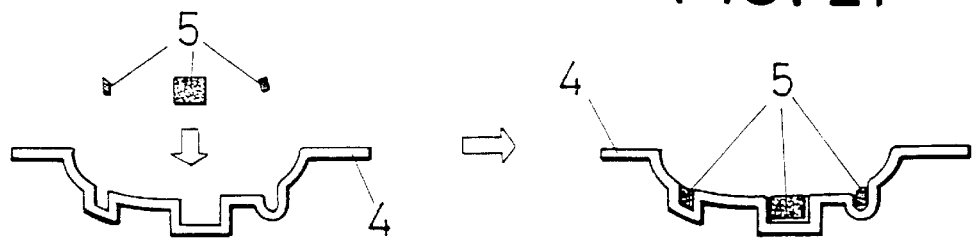
Figure 24:
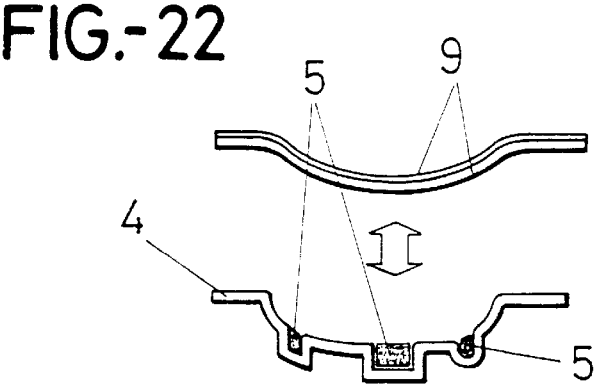
Figure 25:
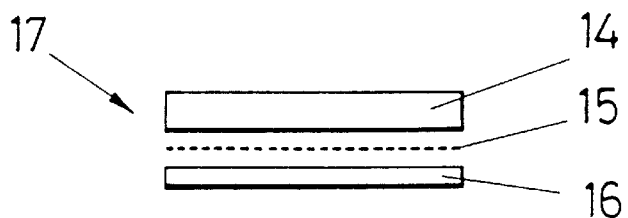
FIGS. 25 to 34 show the different sequences of an alternative realisation of the process of FIGS. 10 to 17 which results in the lining of FIG. 9.
Figure 26:
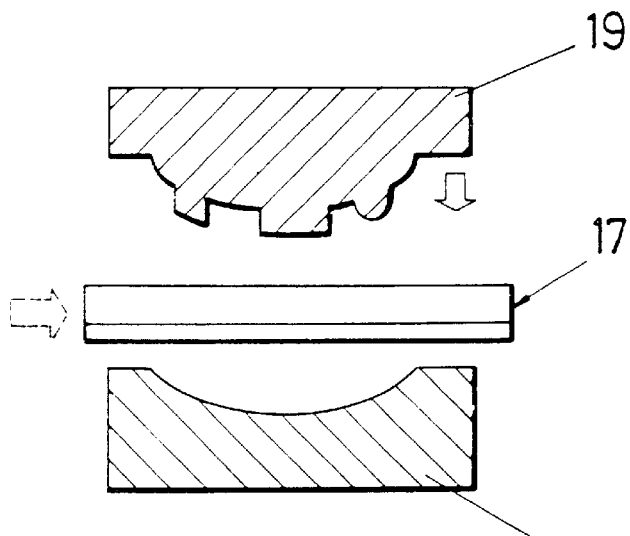
Figure 27:
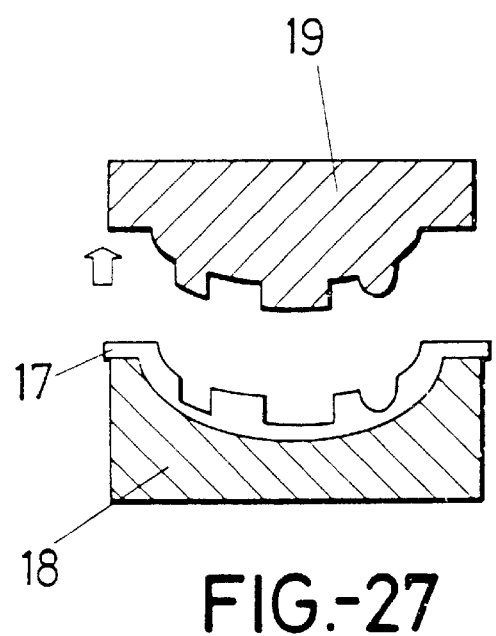
Figures 28, 29:
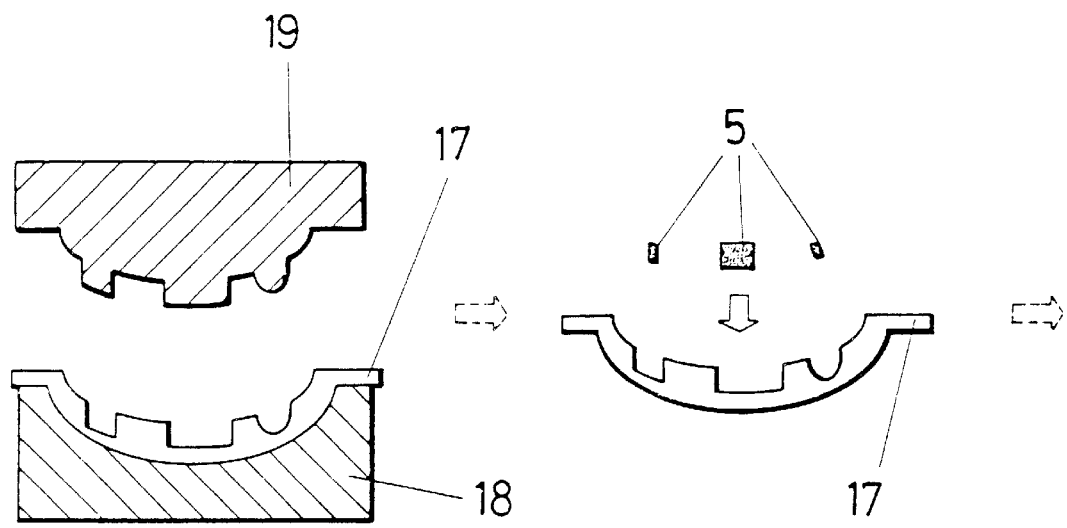
Figure 30:
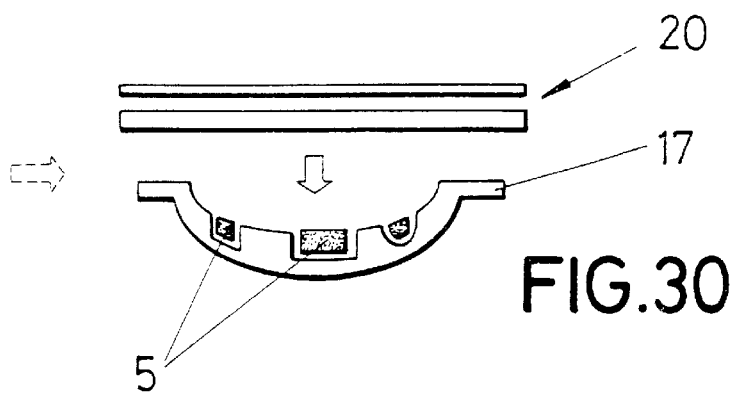
Figure 31:
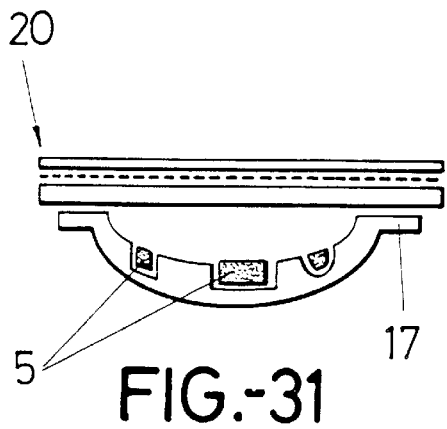
Figure 32:
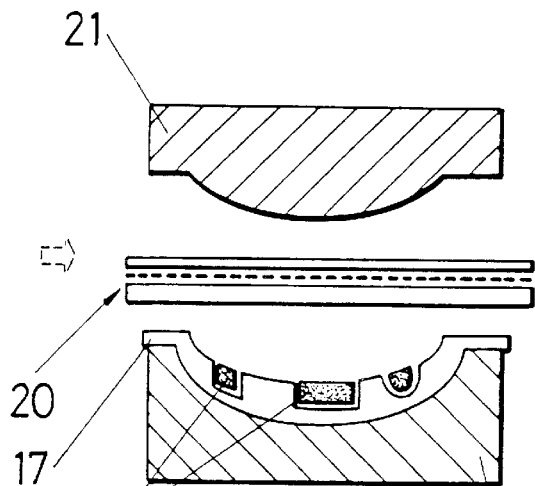
Figure 33:
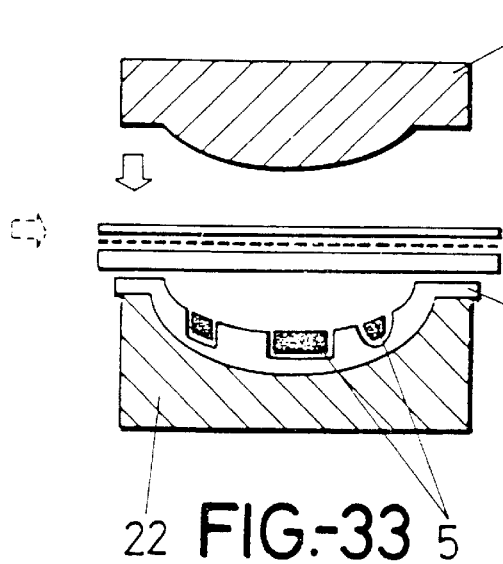

Also employing two presses, and according to FIGS. 18 to 24, first press (10–11) is identical to that of the earlier case, and deformation of support (4) is also achieved in it, while a lower mold (13) is present in the second press matching the curvature of an upper mold (12) as in the second press of the previous case. In this case the sole purpose of the second press is to deform the rest of layers (9) which shall make up the lining, as shown in FIGS. 20 and 21, so that in this case support (4) is obtained shaped for functions (5) on one hand, and on the other remaining layers (9) also shaped are obtained; after functions (5) are inserted the two sets obtained in the presses are joined as seen in FIG. 24, so that the same lining shown in FIG. 9 is obtained.

What is claimed is:

1. A lining manufacturing process for vehicle roof linings with integrated functions, comprising the steps of:

(a) coupling a layered support body to a first moving mold, (b) moving said first moving mold into a position opposite a second mold, (c) closing said second mold onto said first moving mold and thereby forming housings in said layered support body, (d) introducing only accessories for performing integrated functions into said housings, (e) coupling a layered cover body to said first moving mold and said layered support body, (f) moving said first moving mold into a position opposite a third mold, (g) closing said third mold onto the first mold and thereby sealing said accessories between said layered cover body and said layered support body.

2. A lining manufacturing process as in claim 1, wherein prior to performing steps (f) through (g), said layered support body having housings formed therein is removed from said first moving mold prior to introducing said accessories into said housings, said layered cover body is coupled to said layered support body while said layered support body is removed from said first moving mold, and whereby said layered support body, with said inserted accessories and coupled layered cover body, is inserted into said first moving mold.

3. A lining manufacturing process as in claim 2, wherein said second mold further comprises a first contour for deforming said layer support body to form housings in said layer support body, said housings having a second contour that is the same as said first contour, said first moving mold having a third contour that is different from said first contour of said second mold such that only said second mold contributes to the second contour of said housings.

4. A lining manufacturing process in claim 1, wherein said layered support body further comprises a first polyurethane layer on top of a first fiberglass layer and a card or paper layer on top of said first fiberglass layer, said first polyurethane layer having an adhesive on its bottom face, and said layered cover body further comprises a second polyurethane layer with adhesive on its front and back faces and a second fiberglass layer.

5. A lining manufacturing process as in claim 4, wherein said second fiberglass layer further comprises adhesive on its top face.

6. A lining manufacturing process as in claim 1, wherein said second mold further comprises a first contour for deforming said layered support body to form housings in said layered support body, said housings having a second contour that is the same as said first contour, said first moving mold having a third contour that is the same as said first and second contours such that said second contour of said housings is shaped by the first and second contours of the first moving mold and said second mold respectively.

7. A lining manufacturing process for vehicle roof linings with integrated functions, comprising the steps of:

(a) coupling a layered support body to a first moving mold, (b) moving said first moving mold into a position opposite a second mold, (c) closing said second mold onto said first moving mold and thereby forming housings in said layered support body, (d) introducing accessories for performing integrated functions into said housings, said accessories being selected from the group consisting of electrical conducts, lamp soffits, electrical connectors, speakers, head airbags, sun shades, handles, wiring, electronic plates, and air conditioning and heating ducts;

(e) coupling a layered cover body to said first moving mold and said layered support body, (f) moving said first moving mold into a position opposite a third mold, (g) closing said third mold onto the first mold and thereby sealing said accessories between said layered cover body and said layered support body.

8. A lining manufacturing process as in claim 7, where prior to performing steps (f) through (g), said layered support body having housings formed therein is removed from said first moving mold prior to introducing said accessories into said housings, said layered cover body is coupled to said layered support body while said layered support body is removed from said first moving mold, and whereby said layered support body, with said inserted accessories and coupled layered cover body, is inserted into said first moving mold.

9. A lining manufacturing process as in claim 8, wherein said second mold further comprises a first contour for deforming said layer support body to form housings in said layer support body, said housings having a second contour that is the same as said first contour, said first moving mold having a third contour that is different from said first contour of said second mold such that only said second mold contributes to the second contour of said housings.

10. A lining manufacturing process as in claim 7, wherein said layered support body further comprises a first polyurethane layer on top of a first fiberglass layer and as card or paper layer on top of said first fiberglass layer, said first polyurethane layer having an adhesive on its bottom face, and said layered cover body further comprises a second polyurethane layer with adhesive on its front and back faces and a second fiberglass layer.

11. A lining manufacturing process as in claim 10, wherein said second fiberglass layer further comprises adhesive on its top face.

12. A lining manufacturing process as in claim 7, wherein said second mold further comprises a first contour for deforming said layered support body to form housings in said layered support body, said housings having a second contour that is the same as said first contour, said first moving mold having a third contour that is the same as said first and second contours such that said second contour of said housings is shaped by the first and second contours of the first moving mold and said second mold respectively.

* * * * *